United States Patent [19]
Zhang et al.

[11] Patent Number: 6,104,461
[45] Date of Patent: Aug. 15, 2000

[54] LIQUID CRYSTAL DISPLAY DEVICE FOR PREVENTING SHORT CIRCUITS AND METHOD OF MANUFACTURING THE SAME

[75] Inventors: Hongyong Zhang; Masayuki Sakakura; Shirou Isoda, all of Kanagawa, Japan

[73] Assignee: Semiconductor Energy Laboratory Co., Ltd., Kanagawa-ken, Japan

[21] Appl. No.: 09/153,845

[22] Filed: Sep. 16, 1998

[30] Foreign Application Priority Data

Sep. 19, 1997 [JP] Japan ................................. 9-273445

[51] Int. Cl.[7] .................................................. G02F 1/1333
[52] U.S. Cl. ........................... 349/122; 349/138; 349/39
[58] Field of Search ................. 349/38, 39, 122, 349/138, 141, 47, 111, 110

[56] References Cited

U.S. PATENT DOCUMENTS

| | | | |
|---|---|---|---|
| 5,056,895 | 10/1991 | Kahn | 349/122 |
| 5,185,601 | 2/1993 | Takeda et al. | 349/39 |
| 5,706,067 | 1/1998 | Colgan et al. | 349/38 |
| 5,815,226 | 9/1998 | Yamazaki et al. | 349/38 |
| 5,859,677 | 1/1999 | Watanabe et al. | 349/39 |

*Primary Examiner*—James A. Dudek
*Attorney, Agent, or Firm*—Eric J. Robinson; Nixon Peabody LLP

[57] ABSTRACT

An inorganic layer such as a silicon nitride film, a silicon oxide film, or a silicon oxynitride film is interposed between a pixel electrode and a black matrix that constitute a storage capacitor. This structure increases the capacitance per unit area.

29 Claims, 9 Drawing Sheets

LIQUID CRYSTAL DISPLAY DEVICE FOR PREVENTING SHORT CIRCUITS AND METHOD OF MANUFACTURING THE SAME

BACKGROUND OF THE INVENTION

1. Field of the Invention

The present invention relates to an active matrix liquid crystal display device using thin-film transistors.

2. Description of the Related Art

In recent active matrix liquid crystal display devices using thin-film transistors (hereinafter abbreviated as TFTs), large screen sizes such as 20 inches or more and high resolution for SXGA (super extended graphics array) have been realized.

On the other hand, since active matrix liquid crystal display devices are applied to portable information equipment such as a notebook-sized personal computer and a PDA (personal digital assistant), attempts to reduce the power consumption are now being made.

One method for reducing the power consumption is to increase the aperture ratio. Ideally, it is intended to realize an aperture ratio of 80% or more for liquid crystal display devices of about 10 inches and an aperture ratio of 60% or more for those of about 4 inches.

One factor of reducing the aperture ratio is a storage capacitor in a pixel portion. In particular, in high-resolution panels such as small-size panels of 3 inches or less for use in a projector light bulb, the aperture ratio is reduced remarkably by the occupation area of a storage capacitor because the pixel area is small.

As for the classification of the structure of the storage capacitor, it may be formed by:

1) using a gate insulating film;
2) using, an interlayer insulating film;
3) using a passivation insulating film; and
4) combining the methods of items 1)–3).

The structure of item 1) is widely employed because it can provide a large capacitance per unit area.

The connection method of the storage capacitor is classified into:

a) a common electrode type using a dedicated capacitance wiring; and
b) a combined use type using an adjacent scanning line.
   As a matter of fact, the connection method of item b) has a problem that if the scanning direction is changed, the image quality is lowered by a high voltage that instantaneously occurs at the pixel TFT side electrode.

The present inventor has already filed a patent application relating to a scheme (top capacitor scheme) in which a storage capacitor is formed by a pixel electrode and a black matrix by forming the black matrix for light interruption on TFTs and using it as a common electrode, which scheme is an example of the common electrode type connection method using a dedicated capacitor line (Japanese Patent Application No. Hei. 8-58500, which corresponds to U.S. patent application Ser. No. 08/646,512 filed on May 7, 1996).

This black matrix also has a function of shielding underlying bus lines such as source lines and gate lines. FIGS. 8A and 8B show a sectional structure of a pixel portion of a liquid crystal display device which employs the top capacitor scheme.

As shown in FIG. 8A, a double-gate TFT is formed on a substrate 801. The TFT has a semiconductor layer that consists of channel regions 802a and 802b, a source region 803, a drain region 804, and an impurity region 805. Gate electrodes 820a and 820b are formed on the semiconductor layer via a gate insulating film 810.

A first interlayer insulating film 811 made of an inorganic material is formed so as to cover the TFT. A source electrode 821 and a drain electrode 822 are in contact with the source region 803 and the drain region 804 of the TFT through contact holes, respectively.

A second interlayer insulating film 812 made of an organic resin is formed so as to cover the first interlayer insulating film 811 made of an inorganic material and the source electrode 821. The organic resin film 812 is provided so as to eliminate asperities due to the wiring of the TFT and other members, and its surface is approximately flat.

A conductive black film 824 is formed on the thus-formed organic resin film 812, and a third interlayer insulating film 813 made of an organic material is formed thereon. A pixel electrode 829 is in contact with the drain electrode 822 through a contact hole that is formed through the third interlayer insulating film 813 and the second interlayer insulating film 812, whereby the pixel electrode 829 is electrically connected to the drain region 804 of the TFT.

In FIG. 8A, a region indicated by character Y corresponds to a storage capacitor having the black matrix 824 and the pixel electrode 829 as its electrodes. The black matrix 824 is made of a metal such as Ti, Cr, or TiN.

FIG. 8B shows an example in which a contact hole is formed through the second interlayer insulating film, that is, the organic resin film 812 before formation of a black matrix 824 and a second drain electrode 825 is formed so as to contact the drain electrode 822 in forming the black matrix 824.

After a third interlayer insulating film 813 made of an organic material is formed, a pixel electrode 829 is brought into contact with the second drain electrode 825, whereby the pixel electrode 829 is electrically connected to the drain region 804 of the TFT.

Also in FIG. 8B, region Y corresponds to a storage capacitor using the black matrix 824 and the pixel electrode 829.

The top capacitor type storage capacitor (region Y) in the liquid crystal display device is composed of the black matrix, the pixel electrode, and the third interlayer insulating film made of an organic resin.

A conductive layer that is interposed between top and bottom organic resin layers in the above manner is prone to be affected by particles etc. in the adjacent organic resin layers. In particular, in many cases the conductive layer is used as an electrode and particles tend to cause short-circuiting in such a case.

In a study of the inventor, although particles whose sizes are larger than 0.5 $\mu$m can be removed by filtering an organic resin before its use, it is difficult to completely remove particles whose sizes are smaller than 0.5 $\mu$m.

Particles smaller than 0.5 $\mu$m also remain in an organic material of the third interlayer insulating film that constitutes the storage capacitor. Therefore, short-circuiting may occur between the pixel electrode and the black matrix, to impair the capacitor function. Further, the short-circuiting may cause a display failure such as a point defect or a line defect.

According to the experience of the inventor, the probability of occurrence of a display failure due to a particle smaller than 0.5 $\mu$m would be about one-hundred thousandth to one-millionth. For example, in a VGA (video graphics array) panel which has about three hundred thousand pixels, at most several point defects are caused by particles smaller than 0.5 $\mu$m.

The capacitance C of the storage capacitor is expressed by the following equation:

$$C = \epsilon S/d$$

where $\epsilon$ is the permittivity of the substance between the electrode, S is the electrode area, and d is the distance between the electrode.

Therefore, the capacitance of the storage capacitor can be increased by:

d) increasing the electrode area;

e) decreasing the distance between the pixel electrode and the black matrix; and f) increasing the permittivity of the substance between the electrodes.

However, although various improvements have been made along the line of item d), basically the method of item d) decreases the aperture ratio and is difficult to implement particularly in small-size panels.

Although the method of item e) is easy to realize, thinning the third interlayer insulating film will surely increase the probability of occurrence of display failures due to particles because the third interlayer insulating film is made of an organic resin.

To realize the method of item f), it is necessary to dispose a substance having a large permittivity value (for instance, a silicon nitride film) between the electrodes. However, conventionally, to eliminate influences of asperities that are produced by electrodes, wiring lines, etc. when the black matrix is formed on TFTs, planarization is performed by using an organic resin film as the second interlayer insulating film.

It has been found that it is difficult to obtain a silicon nitride film of good quality by the current film forming methods, because gases of water, methane, etc. are generated from an exposed surface of the organic resin film as the second interlayer insulating film when a silicon nitride film is formed on the black matrix.

A silicon nitride film that is directly formed on the organic resin film is prone to peel off due to stress, which lowers the reliability of the liquid crystal display device.

Further, as shown in FIG. 9, where a silicon nitride film 918 is provided, to electrically connect a pixel electrode to a drain region 904, a third interlayer insulating film 913 is etched in a tapered manner and subsequently the silicon nitride film 918 is etched. In a subsequent step of etching a second interlayer insulating film 912, the etching goes around the ends of the silicon nitride film 918 to reach portions under the silicon nitride film 918.

This is because the etching rates of the second interlayer insulating film 912 and the third interlayer insulating film 913 are high while the etching rate of the inorganic layer 918 is low. This causes a problem that a pixel electrode contact failure is prone to occur at step portions indicated by character Z in FIG. 9.

Although contact holes are formed in a tapered manner to some extent, for the sake of simplicity the contact holes are shown by rectangles in the figures other than FIG. 9.

SUMMARY OF THE INVENTION

An object of the present invention is to eliminate short-circuiting due to particles in an organic resin film.

Another object of the invention is to increase the capacitance per unit area of a top capacitor type storage capacitor used in a liquid crystal display device.

A further object of the invention is to form a high-quality film on an organic resin film.

The invention provides a liquid crystal display device comprising top and bottom organic resin layers, the bottom organic resin layer having a planarized surface; a conductive layer interposed between the top and bottom organic resin layers and having approximately the same shape as the conductive layer; and an inorganic layer provided above the conductive layer.

According to another aspect of the invention, there is provided a liquid crystal display device having a storage capacitor comprising a black matrix and a pixel electrode that are formed on an organic resin layer having a flat surface; and a plurality of insulating films provided between the black matrix and the pixel electrode, one of the insulating films that is adjacent to the black matrix is an inorganic layer.

According to a further aspect of the invention, there is provided a liquid crystal display device having a storage capacitor comprising a black matrix and a pixel electrode that are formed on an interlayer insulating film made of an organic resin layer having a flat surface; and a plurality of insulating films provided between the black matrix and the pixel electrode, one of the insulating films that is adjacent to the black matrix is made up of an inorganic layer that is patterned so as to have approximately the same shape as the black matrix.

According to further another aspect of the invention, there is provided a manufacturing method of a liquid crystal display device, comprising forming a thin-film transistor on a substrate having an insulative surface; forming an organic resin layer on the thin-film transistor; forming a conductive layer on the organic resin layer; forming at least one inorganic layer on the conductive layer; executing at least one patterning step; and forming a planarized organic resin layer.

According to still another aspect of the invention, there is provided a manufacturing method of a liquid crystal display device, comprising forming a thin-film transistor on a substrate having an insulative surface; forming a first interlayer insulating film so as to cover the thin-film transistor; forming a second interlayer insulating film made of an organic material and having a flat surface on the first interlayer insulating film; forming a black matrix on the second interlayer insulating film; forming an inorganic layer on the black matrix; patterning the black matrix and the inorganic layer into approximately the same shape; forming a third interlayer insulating film made of an organic resin after the above step; and forming a pixel electrode so that it is electrically connected to a drain region of the thin-film transistor, wherein the pixel electrode and a patterned black matrix constitute a storage capacitor.

According to yet another aspect of the invention, there is provided a manufacturing method of a liquid crystal display device, comprising forming a thin-film transistor on a substrate having an insulative surface; forming a first interlayer insulating film so as to cover the thin-film transistor; forming a second interlayer insulating film made of an organic material and having a flat surface on the first interlayer insulating film; forming a black matrix on the second interlayer insulating film; patterning the black matrix; anodizing a patterned black matrix; forming a third interlayer insulating film made of an organic resin after the above step; and forming a pixel electrode so that it is electrically connected to a drain region of the thin-film transistor, wherein the pixel electrode and the patterned black matrix constitute a storage capacitor.

In the above-described liquid crystal display devices and the manufacturing methods of a liquid crystal display device, the inorganic layer may be made of one of silicon oxide, silicon nitride, and silicon oxynitride.

One of the plurality of insulating films that is closest to the pixel electrode may be a planarized organic resin layer.

As described above, by providing an inorganic layer having a large permittivity value on the black matrix, the capacitance per unit area can be increased.

In the top capacitor scheme, the black matrix is a conductive layer interposed between organic resin layers. By forming the inorganic layer, the black matrix is protected from particles existing in the organic resin layers, whereby it is prevented from being short-circuited.

DETAILED DESCRIPTION OF THE PREFERRED EMBODIMENTS

Figure 1:
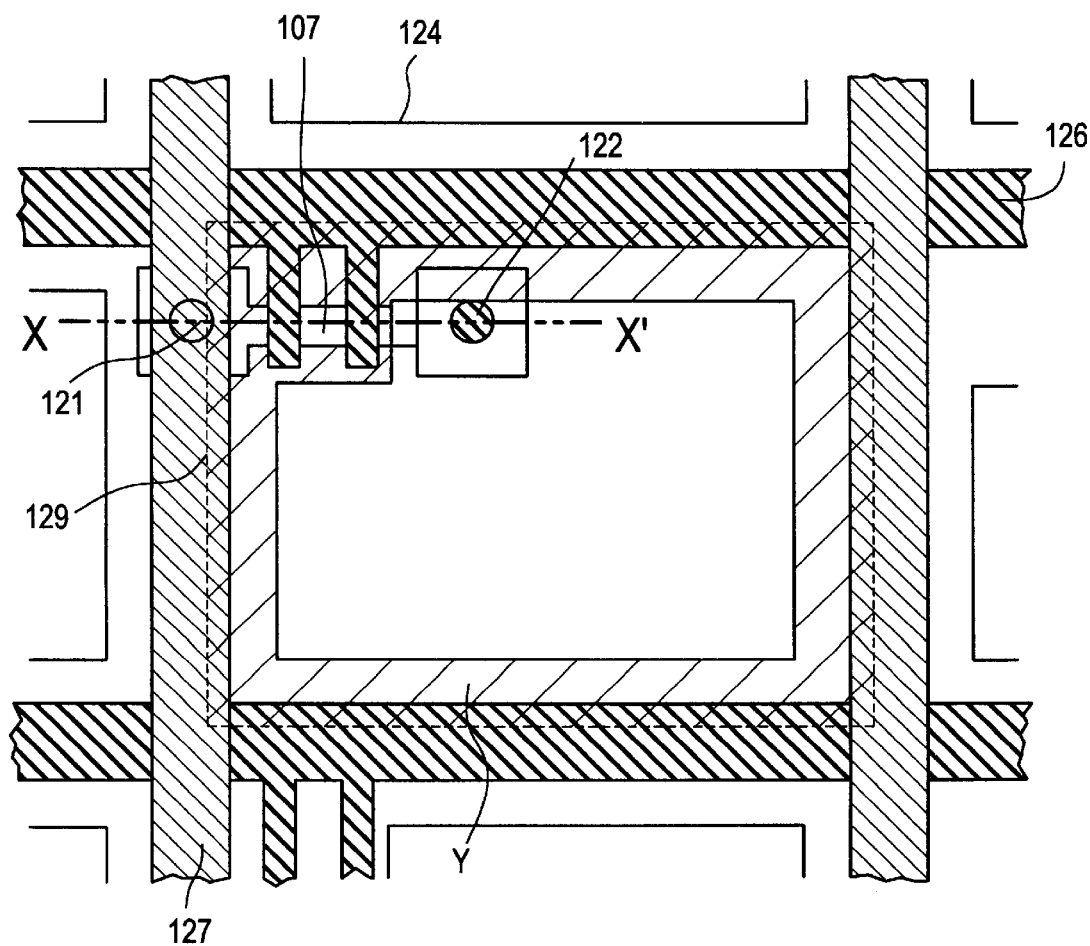
FIG. 1 is a schematic top view of one pixel of an active matrix liquid crystal display device according to the present invention.

In the invention, the permittivity of the inorganic layer is an important factor and the inorganic layer may be a amorphous silicon nitride film, an amorphous silicon oxide film, a silicon oxynitride ($SiO_xN_y$) film, a DLC (diamond-like carbon) film, $Al_2O_3$ film, a $Ta_2O_5$ film, or a $TiO_2$ film, or a laminated film thereof. In particular, it is preferable to use a silicon nitride film having a large permittivity value and capable of being etched selectively.

Typical permittivity values of the above materials and permittivity values of polyimide and acrylic for comparison are shown below.

| | |
|---|---|
| Amorphous silicon nitride film | $\epsilon = 7$ |
| Amorphous silicon oxide film | $\epsilon = 4$ |
| Silicon oxynitride film | $\epsilon = 4.5–5$ |
| DLC film | $\epsilon = 8–12$ |
| $Al_2O_3$ film | $\epsilon = 8$ |
| $Ta_2O_5$ film | $\epsilon = 20–27$ |
| $TiO_2$ film | $\epsilon = 30–40$ |
| Polyimide | $\epsilon = 2.8–3.4$ |
| Acrylic | $\epsilon = 3.2$ |

In providing the inorganic layer, its thickness is also important. Although it is preferable to shorten the distance between the electrodes by decreasing the film thickness, it is desirable to make the dielectric breakdown voltage of the storage capacitor 20 V or more.

If the film thickness is as small as 10–30 nm, it is difficult to obtain a uniform film thickness profile and hence pinholes or the like are prone to occur.

On the other hand, if the inorganic layer is too thick, a level difference produced by the black matrix and the inorganic layer becomes too large to perform satisfactory planarization with the third interlayer insulating film. If the third interlayer insulating film is made thicker to obtain a satisfactory planarization result, the capacitance of the storage capacitor is necessarily decreased. In view of this, the thickness of the inorganic layer should be such that the total thickness of the black matrix and the inorganic layer is 700 nm or less, preferably 500 nm or less.

Where a single-layer silicon nitride film is used, its thickness needs to be 50 nm or more. Where a 200-nm-thick black matrix is formed, the thickness of the silicon nitride film should be 50–300 nm, preferably 50–200 nm, more preferably 50–100 nm.

Where an inorganic layer having a multilayered structure is used, a structure is possible in which a DLC film having a large permittivity value is formed on the black matrix and a silicon nitride layer, a silicon oxide layer, or a silicon oxynitride layer as a top layer is formed thereon.

With this structure, the top layer is selectively etched with a chlorine-type etchant and then the DLC film is etched with an oxygen-type etchant. In this case, a resist can be ashed at the same time as the etching. Therefore, a patterned inorganic layer can be obtained by a smaller number of steps than with other multilayered structures.

Although having a permittivity value that is not much different from that of polyimide, a silicon oxide film is high in insulation performance and small in leak current and hence can provide high reliability against short-circuiting and the like. It is therefore effective to use a silicon oxide film as an insulating film of the storage capacitor. In particular, it is effective to use a silicon oxide film as one layer of a multilayered inorganic layer.

Where the black matrix is made of Al or Ta, it is effective to form an $Al_2O_3$ film or a $Ta_2O_5$ film on its surface by anodization, because an inorganic layer having a large permittivity value is made less prone to peel off due to stress that is exerted from the black matrix and can be formed in a self-aligned manner.

Further, since the inorganic layer is formed adjacent to the black matrix, the frequency of occurrence of display failures due to particles smaller than 0.5 $\mu$m that remain in an organic material of the third interlayer insulating film can be reduced.

In a basic manufacturing method according to the invention, the inorganic layer is formed before the black matrix is patterned. That is, there exists at least one patterning step after formation of the inorganic layer and before formation of the third interlayer insulating film.

This does not apply to the above-mentioned case in which an anodic oxide film is used as the inorganic layer. In this case, the anodic oxide film may be formed after the patterning.

As a result, the second interlayer insulating film made of an organic resin can be prevented from emitting a gas.

Further, by patterning the black matrix and the inorganic layer into approximately the same shape, the stress can be reduced and hence peeling can be prevented.

Although the above description is directed to the storage capacitor including the black matrix and the pixel electrodes which is an example of the invention, the invention can broadly be used to solve particle-related problems that are associated with a conductive layer interposed between organic resin films.

An example of a conductive layer interposed between organic resin films is a source line or a drain electrode in a case where the first interlayer insulating film is made of an organic resin.

In this specification, a plurality of films patterned by using the same mask are regarded as having approximately the same shape. Further, as described later, the black matrix and the inorganic layer that is formed so as to have a visor-like shape are regarded as having approximately the same shape.

In this specification, the term "electrode" includes a conductor portion to be electrically connected to a source region or a drain region of a TFT or a conductor portion that functions as a gate of a TFT.

In this specification, the term "chlorine-type etchant" includes a chlorine gas or a gas of a compound including chlorine.

Examples are single-element/compound gases of $Cl_2$, $BCl_3$, $SiCl_4$, HCl, and $CCl_4$, gases as a mixture thereof, and gases obtained by diluting any of those single-element/compound gases and mixtures thereof with a gas not containing chlorine (for instance, $H_2$, $O_2$, or $N_2$).

In this specification, the term "fluorine-type etchant" includes a fluorine gas or a gas of a compound including fluorine. Examples are single-element/compound gases of $F_2$, $BF_3$, $SiF_4$, HF, and $CF_4$, gases as a mixture thereof, and gases obtained by diluting any of those single-element/compound gases and mixtures thereof with a gas not containing fluorine (for instance, $H_2$, $O_2$, or $N_2$).

In this specification, the term "oxygen-type etchant" includes a gas containing oxygen. Examples are $O_2$, $O_3$, and gases obtained by diluting $O_2$ or $O_3$ with a gas not containing oxygen (for instance, $N_2$ or He).

Embodiment 1

FIG. 1 is a schematic top view of one pixel of an active matrix liquid crystal display device according to the invention. In FIG. 1, reference numerals 107 and 126 denote a semiconductor layer of a TFT and a gate line, respectively. Reference numerals 127 and 121 denote a source line and a source electrode, respectively. A black matrix 124 indicated by thick lines in FIG. 1 is formed on the respective wiring lines. A pixel electrode 129 indicated by a broken line in FIG. 1 is electrically connected to a drain electrode 122.

Region Y indicated by bottom-left-to-top-right slanted lines that is enclosed by the thick lines and the broken line in FIG. 1 is a region where the black matrix 124 and the pixel electrode 129 coextend and hence a storage capacitor is formed.

Figure 2A:
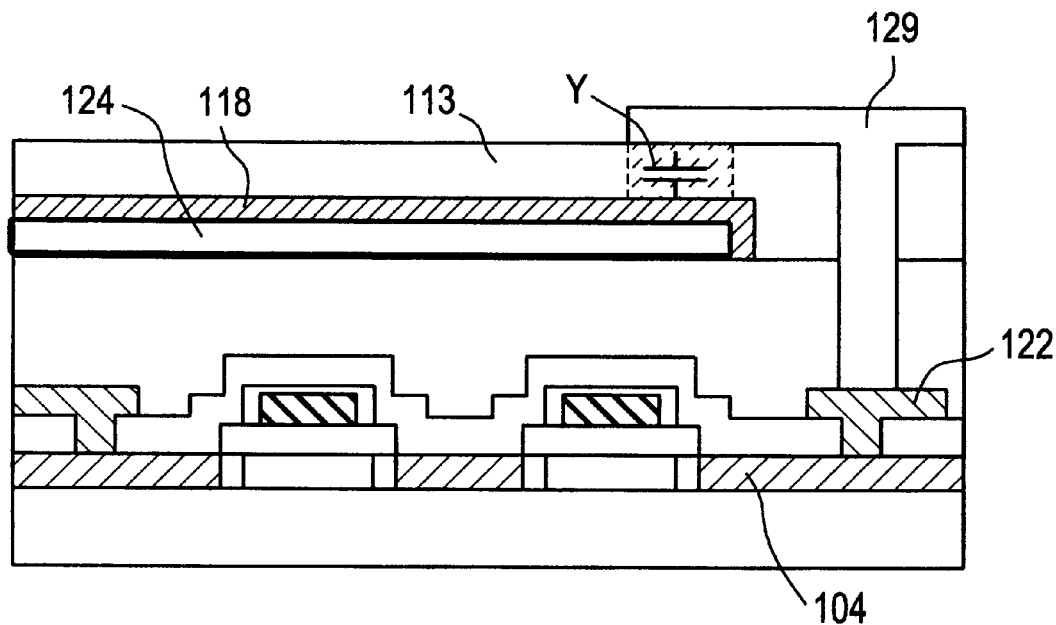
FIG. 2A is a schematic sectional view of a TFT substrate taken along line X–X' in FIG. 1.
Figure 4A:
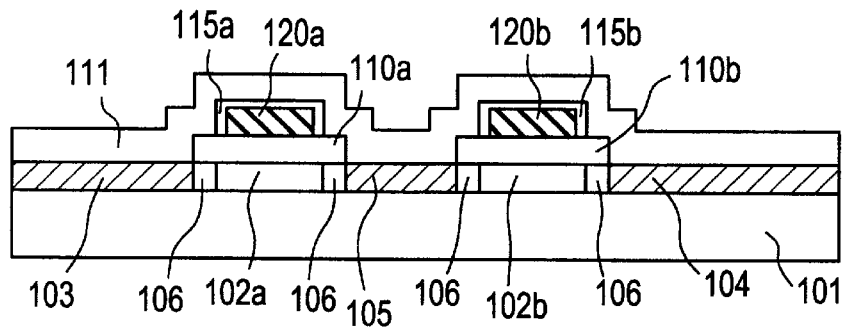
FIGS. 4A–4C show a manufacturing process of the TFT substrate of FIG. 2A.
Figure 4B:
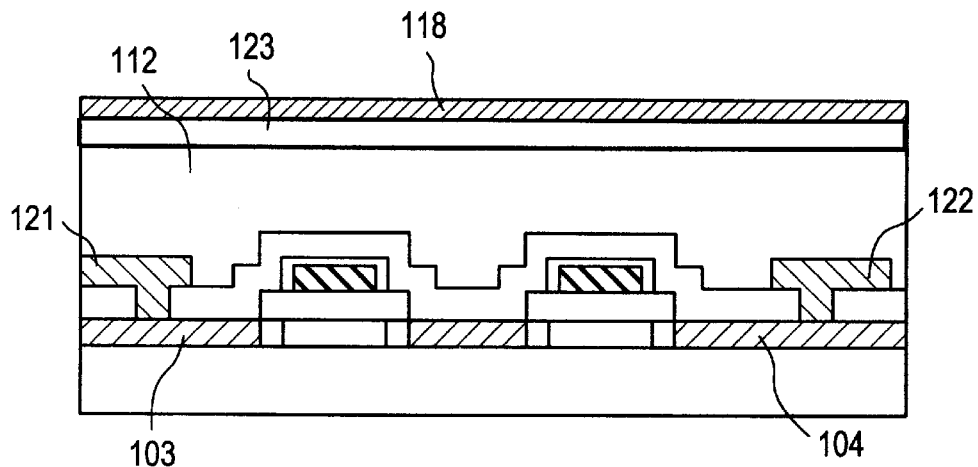
Figure 4C:
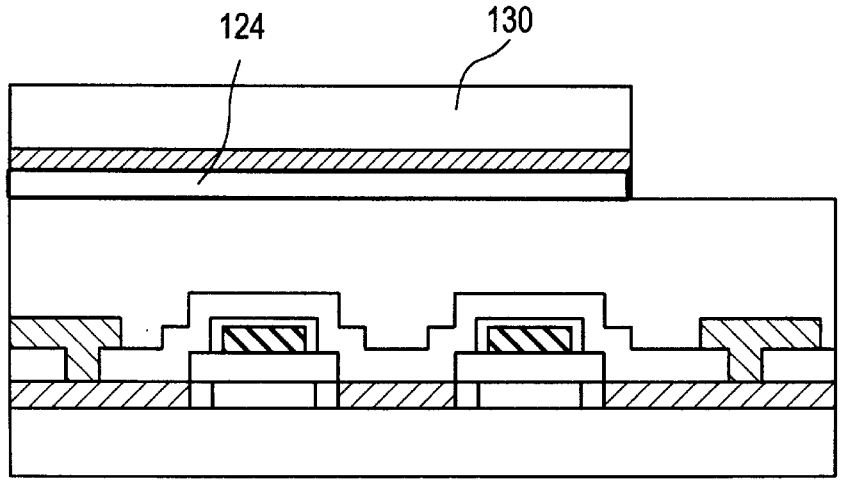

FIG. 2A is a schematic sectional view of a TFT substrate taken along line X–X' in FIG. 1. FIGS. 4A–4C show its manufacturing process.

First, as shown in FIG. 4A, an undercoat insulating film (not shown) is formed on a substrate 101. The substrate 101 may be a glass substrate, a quartz substrate, or a semiconductor substrate. A glass substrate is used in this embodiment. Where a quartz substrate whose processing subject surface is sufficiently cleaned is used as the substrate 101, the undercoat insulating film may be omitted.

The undercoat insulating film may be a silicon oxide film, a silicon nitride film, a silicon oxynitride film, or the like that is 100–300 nm in thickness. In this embodiment, a 200-nm-thick silicon oxide film is formed by plasma CVD (chemical vapor deposition) by using TEOS as a material.

Then, a semiconductor layer of 20–100 nm in thickness is formed on the undercoat silicon oxide film. In this embodiment, a 50-nm-thick, intrinsic amorphous silicon film is formed by plasma CVD as the semiconductor layer. Instead of plasma CVD, a silicon film may be formed by LPCVD (low-pressure CVD).

Although an intrinsic amorphous silicon film is formed in this embodiment, a p-type silicon film doped with boron for threshold voltage control or an n-type silicon film doped with phosphorus for threshold voltage control may be used. Further, a polysilicon film or a microcrystalline silicon film may be used. Still further, instead of a silicon film, a film of a compound semiconductor such as GaAs, $Si_XGe_{1-X}$ (0<X<1), GaP, InP, InSb, CdS, or PbSe may be formed by MOCVD (metal organic CVD) and used as the semiconductor layer.

After a patterned mask silicon oxide film is formed on the amorphous silicon film, Ni is added thereto. Ni serves as a catalyst for allowing the amorphous silicon film to be crystallized at a lower temperature in a crystallization step. A detailed mechanism is disclosed in Japanese Unexamined Patent Publication No. Hei. 8-78329. The entire disclosure of this patent is incorporated herein by reference.

In a state that the Ni element has been added selectively to the silicon film in the above manner, thermal annealing is performed whereby crystal growth proceeds laterally, that is, parallel with the substrate surface from a Ni-added portion. In this embodiment, crystallization is performed at 560° C. for 17 hours.

Then, the mask silicon oxide film is removed. After a new patterned silicon oxide film is formed, phosphorus is added to exposed portions of a crystalline silicon film. Phosphorus has an effect of removing the Ni element that was used for the crystallization from the crystalline silicon film by gettering it. The details of the gettering by phosphorus are disclosed in Japanese Patent Application No. Hei. 7-216608. The entire disclosure of this patent is incorporated herein by reference.

Phosphorus may be added at $1\times10^{17}$ $cm^{-3}$ to $2\times10^{20}$ $cm^{-3}$. In this embodiment phosphorus is added at $5\times10^{19}$ $cm^{-3}$. Thereafter, gettering is performed by heating the substrate. The temperature may be set to 550° C.–650° C. In this embodiment, the temperature is set to 600° C.

Patterning is performed on a resulting crystalline silicon film, and a gate insulating film is formed on a patterned silicon film. The gate insulating film may be a silicon oxide film, a silicon nitride film, a silicon oxynitride film, or a laminated film thereof that is 100–300 nm in thickness. In this embodiment, a 120-nm-thick silicon oxynitride film is formed, as the gate insulating film, by plasma CVD using $SiH_4$ and $N_2O$.

Thereafter, a metal film is formed by sputtering and then patterned into a 400-nm-thick gate line 126 parts of which are gate electrodes 120a and 120b. Although in this embodiment the gate line 126 is made of an aluminum alloy, it may be made of chromium, tantalum, or an alloy of molybdenum and tantalum, or may have a layered structure of tantalum and aluminum, a layered structure of chromium and aluminum, or the like.

Then, anodization is performed on the gate line 126, to form anodic oxide films. Each anodic oxide film is composed of two kinds of films, that is, an outside porous anodic oxide film and an inside dense anodic oxide film. Low-concentration impurity regions and offset regions are formed by using the two kinds of anodic oxide films. The details are disclosed in Japanese Unexamined Patent Publication No. Hei. 7-135318. The entire disclosure of this patent is incorporated herein by reference.

Then, the gate insulating film is etched out except the portions under the gate line 126 and the anodic oxide films. Thereafter, an outside porous anodic oxide film is removed. In this state, an impurity is introduced in a self-aligned manner by using the gate line 126 as a mask. In this embodiment, an n-type TFT is formed by introducing phosphorus as the impurity. To form a p-type TFT, boron may be introduced instead of phosphorus.

Thereafter, to activate a source region 103, a drain region 104, and an impurity-added region 105 that are doped with phosphorus, excimer laser light is applied. To produce laser light, an excimer laser using XeCl, ArF, KrF, KrCl, or the like may be used. In this embodiment, activation is performed by a line scan method by using a KrF excimer laser (oscillation wavelength: 248 nm).

The n-type TFT has channel regions 120*a* and 120*b* under the respective gate electrodes 120*a* and 120*b*. Low-concentration impurity regions 106 that have been formed at a low dose because of the presence of the gate insulating films 110*a* and 110*b* are provided between the source region 103 and the channel region 102*a*, between the impurity-added region 105 and the channel regions 102*a* and 102*b*, and between the drain region 104 and the channel region 102*b*. Offset regions are formed under the dense anodic oxide films 115*a* and 115*b*.

A first interlayer insulating film 111 is formed so as to cover the thus-completed n-type TFT. The first interlayer insulating film 111 may be an inorganic film such as a silicon oxide film, a silicon nitride film, a silicon oxynitride film, or a phospho-silicate glass (PSG) film, or a laminated film thereof. In this embodiment, a 900-nm-thick silicon oxide film is formed as the first interlayer insulating film 111.

The structure of FIG. 4A is thus obtained. After contact holes are formed through the first interlayer insulating film 111, a metal film to constitute a source line is formed. The metal film may be made of aluminum, chromium, tantalum, an alloy of molybdenum and tantalum, or the like, or may have a laminated structure of tantalum and aluminum, a laminated structure of titanium and aluminum, a laminated structure of chromium and aluminum, or the like. In this embodiment, a/titanium/aluminum/titanium laminated film is formed at thicknesses of 1,500/3,000/100 nm.

The metal film is then patterned into a source line 127. Contact between the source region 103 and a source electrode 121 that is part of the source line 127 is thus established through the contact hole. At the same time, a drain electrode 122 is formed so as to be connected to the drain region 104 through the contact hole. Although not shown in FIG. 4B, a lead-out electrode for keeping a black matrix at the ground potential is also formed when the source line 127 is formed.

Then, a polyimide film is formed as a second interlayer insulating film 112. As for the film forming method, a coating having a flat surface can easily be obtained by spin coating using a spinner. Provided with a filter, the spinner can remove particles larger than 0.5 µm. Instead of polyimide, the second interlayer insulating film 112 may be made of acrylic or some other organic resin. Further, the second interlayer insulating film 112 may have a laminated structure of an insulating film made of an inorganic material and an insulating film made of an organic resin. The thickness of the second interlayer insulating film 112 may be set to 500 nm to 3.0 µm. In this embodiment, the thickness is set to 1.0 µm.

Thereafter, the polyimide film is fired at 300° C. for 1 hour. A 200-nm-thick titanium film as a black matrix 123 is formed on the thus-formed flat polyimide film 112 by RF sputtering while heating is performed at 150° C. In a later step, the black matrix 123 will be connected electrically to the lead-out electrode that was formed at the same time as the source line 127, so as to become one electrode of a storage capacitor and be kept at 0 V.

The material of the black matrix 123 may be selected properly from among titanium, aluminum, tantalum, chromium, titanium nitride, and the like. Its thickness may be set to a proper value in a range of 100–400 nm.

The black matrix 123 made of aluminum, tantalum, chromium, or titanium nitride may be formed by sputtering. In particular, it can be formed simply and easily by RF sputtering. It may also be formed by evaporation.

After the formation of the black matrix 123, an inorganic layer 118 is formed thereon. In this embodiment, a single layer of a silicon nitride film having a large permittivity value is formed by plasma CVD. As for the film forming conditions of this embodiment, $SiH_4$, $NH_3$, and $N_2$ as reaction gases are supplied at 5, 38, and 87 sccm, respectively. The reaction temperature and the thickness are set to 250° C. and 100 nm, respectively.

Instead of a silicon nitride film, the inorganic layer 118 may be a silicon oxide film, a silicon oxynitride film, a DLC film, an $Al_2O_3$ film, a $Ta_2O_5$ film, a $TiO_2$ film, or a TaN film, or a laminated film thereof.

Where a silicon oxide film is used as the inorganic film 118, reaction gases of $SiH_4$ or TEOS, and oxygen or ozone may be used in the plasma CVD of this embodiment. Where a silicon oxynitride film is used, reaction gases of $SiH_4$, $N_2O$, and/or $N_2$ may be used. Where a DLC film is used, it may be formed by sputtering a carbon target in a hydrogen atmosphere, or by ion beam deposition or ECR (electron cyclotron resonance) CVD in which a reaction gas of a hydrocarbide (and hydrogen). Where an $Al_2O_3$ film, a $Ta_2O_5$ film, a $TiO_2$ film, or a TaN film is used as the inorganic film 118, it may be formed by sputtering.

If a crystalline coating is used as the inorganic layer 118, grain boundaries probably causes a pinhole or a crack, resulting in a display failure or unevenness. Therefore, it is preferable that the inorganic layer 118 for the storage capacitor be an amorphous coating having uniform film quality. To form an amorphous inorganic layer 118, it is preferable to set the reaction pressure high and/or set the temperature low during formation of the inorganic layer 118.

The structure of FIG. 4B is thus obtained. Thereafter, a resist is formed on the inorganic layer 118 and then patterned into a pattern 130 for the black matrix.

Then, the silicon nitride as the inorganic layer 118 is etched by anisotropic dry etching such as RIE (reactive ion etching). The etchant may be a fluorine-type one. In this embodiment, $CF_4$ and $O_2$ are supplied at 40 sccm and 60 sccm, respectively.

Where the inorganic layer 118 is a silicon nitride film, a silicon oxide film, a silicon oxynitride film, a $Ta_2O_5$ film, or a TaN film, a fluorine-type etchant may be used. Where it is a DLC film, an oxygen-type etchant may be used.

For chemically stable substances such as $Al_2O_3$ and $TiO_2$, physical etching (for instance, ion milling) with He ions or Ar ions can be used.

Then, by using the same mask, the titanium film as the black matrix 123 is etched. The etchant may be a chlorine-type one. In this embodiment, $Cl_2$, $BCl_3$, and $SiCl_4$ are supplied at 40 sccm, 10 sccm, and 180 sccm, respectively.

Where the black matrix 123 is made of Cr, Al, or TiN, a chlorine-type etchant may be used as described above. Where it is made of Ta, a fluorine-type etchant may be used.

Where the patterning on the inorganic layer 118 is physical etching, it is effective to etch the black matrix 123 at the same time. Further, where the material of the inorganic layer 118 can be etched with a chlorine-type etchant, the black matrix 123 can be etched at the same time as the inorganic layer 118. This is effective in terms of simplification of the process.

Where a chlorine-type etchant is used to etch the black matrix 123, it is possible to reduce influences on the underlying second interlayer insulating film 112 that is made of an organic resin.

As described above, there is at least one patterning step (in this embodiment, two patterning steps for the inorganic layer 118 and the black matrix 123) after the formation of the inorganic film 118 and before formation of a third interlayer insulating film 113.

A patterned black matrix 124 is thus obtained as shown in FIG. 4C. Then, after the pattern 130 is peeled off by wet etching, a third interlayer insulating film 113 is formed. In this embodiment, a polyimide film is again formed at a thickness of 0.3–0.7 µm (typically 0.5 µm) by using a spinner that is equipped with a filter.

The third interlayer insulating film 113 is required to be flat because a pixel electrode will be formed thereon. An organic resin such as polyimide or acrylic can be used for this purpose. Use of the same material for the second interlayer insulating film 112 and the third interlayer insulating film 113 can greatly reduce stress and can thereby provide strong adhesion. Further, since they have the same etching rate when contact holes are formed therethrough, the amount of etching residues can be reduced and hence the frequency of occurrence of contact failures can be reduced considerably.

After a resist pattern is formed on the thus-formed third interlayer insulating film 113, contact holes are formed. In this embodiment, dry etching is performed by supplying $CF_4/O_2/He$ at 5/95/40 sccm.

Although the contact holes can also be formed by wet etching, dry etching is preferable because it requires a smaller margin and hence useless spaces can be reduced. The contact holes include one for electrically connecting the lead-out line and the black matrix 124 to each other.

Then, after the resist is removed, a conductive film to constitute a pixel electrode is formed and electrically connected to the drain region 104 of the TFT via the drain electrode 122. In this embodiment, the conductive film is made of ITO (indium tin oxide). At the same time, the lead-out line and the black matrix 124 are electrically connected to each other via the conductive film.

Then, the conductive film is patterned into a pixel electrode 129. A TFT substrate of a liquid crystal display device utilizing the invention is thus completed as shown in FIG. 2A.

In the liquid crystal display device using the TFT substrate thus formed, the silicon nitride film as the inorganic film 118 is formed between the pixel electrode 129 and the black matrix 124. Therefore, the capacitance of the storage capacitor in a pixel portion can be increased and hence a high contrast can be obtained. Further, since the capacitance per unit area can be increased, the area of the storage capacitor that is formed by the black matrix 124 and the pixel electrode 129 can be reduced, as a result of which the pixel area can be increased.

Although in this embodiment the transmission-type liquid crystal display device is manufactured by using the ITO pixel electrode 129, it is also possible to manufacture a reflection-type liquid crystal display device by using a reflective electrode made of Al, Ti, or the like as the pixel electrode 129. The reflective electrode made of Al, Ti, or the like may be formed by sputtering.

In this embodiment, the black matrix 124 and the inorganic layer 118 have the same shape because the former is patterned in a self-aligned manner. Alternatively, as shown in FIG. 3B, the inorganic layer 118 may be given a visor-like shape by performing excessive etching in the step of patterning the black matrix 124. This structure is preferable because even the end portion of the black matrix 124 can be prevented from being short-circuited due to particles existing in the organic resin.

In FIG. 3B, reference numerals 129 and 113 denote a pixel electrode and a third interlayer insulating film, respectively. A storage capacitor is formed in region Y.

In this embodiment, the black matrix 124 and the inorganic layer 118 have the same shape because the former is patterned in a self-aligned manner. The black matrix 124 and the inorganic layer 118 may be given different patterns by using different masks therefor. This does not lower the effects of the structure of the invention that a high-quality inorganic layer is formed on an organic resin.

Even where different masks are used for formation of the black matrix 124 and the inorganic layer 118, the black matrix 124 necessarily exists under the inorganic layer 118 except for a visor-like portion of the inorganic layer 118. Therefore, there is at least one patterning step after the formation of the inorganic layer 118 and before the formation of the third interlayer insulating film 113.

Embodiment 2

Figure 2B:
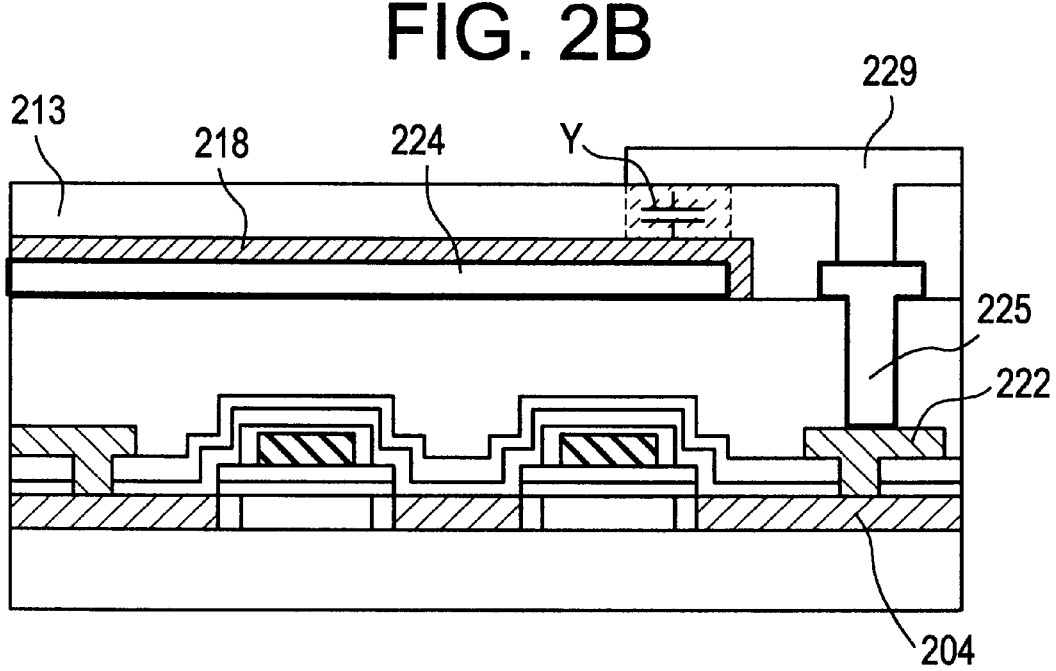
FIG. 2B is a schematic sectional view of a TFT substrate according to the invention.
Figure 5A:
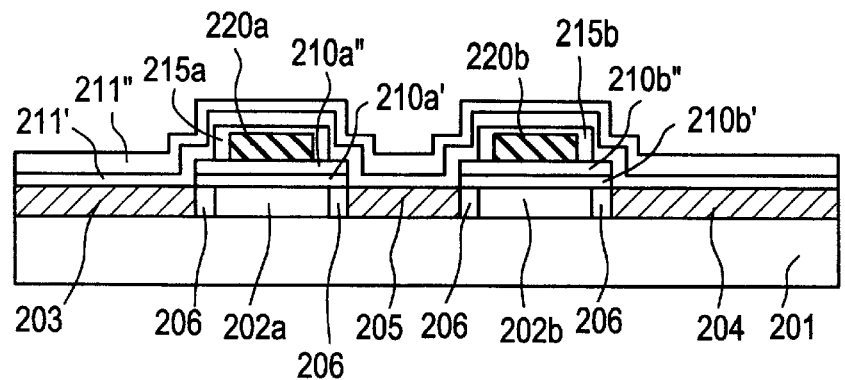
FIGS. 5A–5C show a manufacturing process of the TFT substrate of FIG. 2B.
Figure 5B:
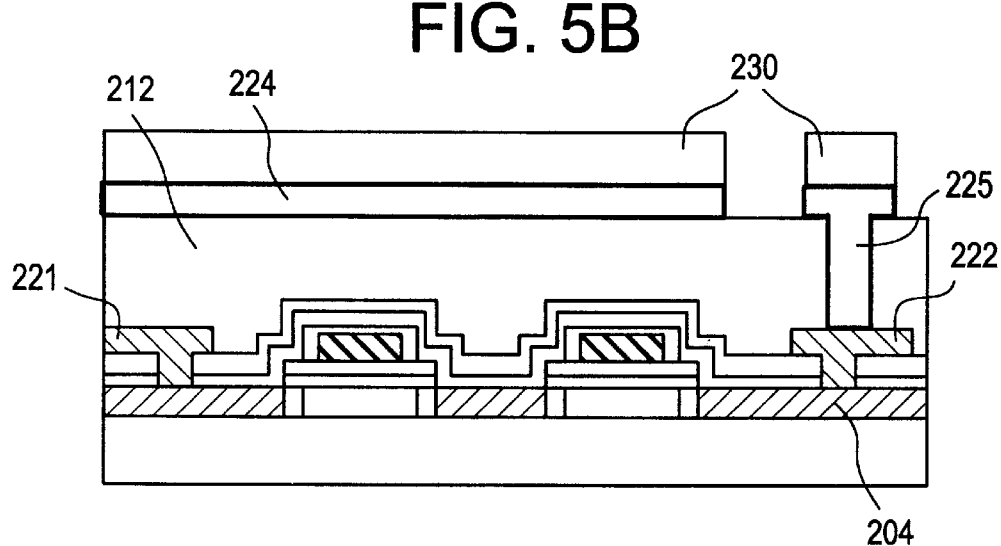
Figure 5C:
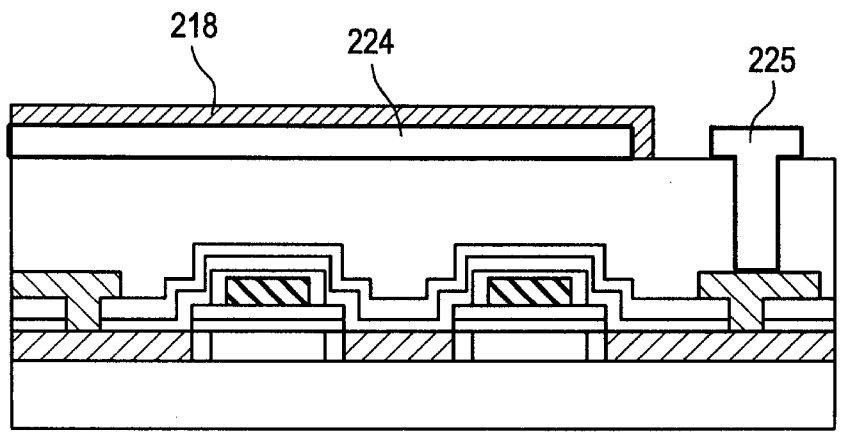

This embodiment is directed to a case where to make an electrical connection between a drain region 204 and a pixel electrode 229 a second drain electrode 225 is formed in addition to a drain electrode 222 in a step of forming a black matrix 224 (see FIG. 2B). FIGS. 5A–5C show a manufacturing process of this embodiment.

First, a quartz substrate whose surface has been cleaned sufficiently is prepared as a substrate 201. A 80-nm-thick amorphous silicon film is formed on the substrate 201 by LPCVD.

Then, the amorphous silicon film is crystallized by adding Ni in the same manner as in the first embodiment. Thereafter, a thermal oxidation film is formed by performing a heat treatment at 850° C.–1,100° C. in an oxygen atmosphere containing HCl at 1–10 vol %. In this embodiment, a thermal oxidation film is formed under conditions that the HCl content is 3 vol %, the temperature is 950° C., and the process time is 30 minutes. As a result, by virtu of the action of chlorine, the Ni element is moved to the thermal oxidation film and gettered there.

Then, the thermal oxidation film is removed. Thereafter, for threshold voltage control of a TFT, boron is added to at least a region that will become a channel of the TFT. In this embodiment, the dose of boron is set to $6 \times 10^{13}$ $cm^{-2}$.

Then, patterning is performed on a resulting crystalline silicon film. Thereafter, a silicon oxynitride film as a gate insulating film is formed on a patterned crystalline silicon film by plasma CVD using $SiH_4$ and $N_2O$. In this embodiment, the silicon oxynitride film is formed at a thickness of 100 nm. Then, a thermal oxidation film is again formed by performing a heat treatment at 850° C.–1,100° C. in an oxygen atmosphere containing HCl at 1–10 vol %. Being formed between the crystalline silicon film and the silicon oxynitride film, this thermal oxidation film can greatly increase the withstand voltage of a gate insulating film 210.

Then, a metal film to constitute a gate line is formed by sputtering. In this embodiment, a 400-nm-thick Al film is formed. Then, the metal film is patterned into a gate line and two kinds of anodic oxide films are formed in the same manner as in the first embodiment. Subsequently, the gate insulating film is etched by using the gate line and the anodic oxide films as a mask, whereby gate insulating films 210"*a* and 210"*b* of silicon oxynitride films and gate insulating films 210'*a* and 210'*b* of thermal oxidation films are formed (see FIG. 5A).

Then, after the porous anodic oxide films are removed in the same manner as in the first embodiment, phosphorus is added to form an n-type TFT. In the n-type TFT, channel regions 202*a* and 202*b* are formed under respective gate electrodes 220*a* and 220*b*. Low-concentration impurity regions 206 for which the dose is reduced by the gate insulating films are formed between a source region 203 and the channel region 202*a*, between an impurity-added region 205 and the channel regions 202*a* and 202*b*, and between a drain region 204 and the channel region 202*b*. Offset regions are formed under dense anodic oxide films 215*a* and 215*b*.

A first interlayer insulating film is formed on the n-type TFT. In this embodiment, a laminated film of a silicon oxide film 211' and a phospho-silicate glass film 211" is formed as the first interlayer insulating film. The silicon oxide film 211' is formed at a thickness of 100 nm by plasma CVD using TEOS and $O_2$. The phospho-silicate glass film 211" is formed thereon at a thickness of 800 nm by plasma CVD using TEOS, $PH_3$, and $O_2$.

Then, after contact holes are formed, a metal film to constitute a source line is formed. In this embodiment, Ti/Al/Ti film is used as in the case of the first embodiment. Then, patterning is performed to form a source electrode 221 that is part of a source line and is in contact with the source region 203. At the same time, a first drain electrode 222 is formed so as to be electrically connected to the drain region 204.

In this step, as in the case of the first embodiment, a Ti/Al/Ti lead-out electrode to keep a black matrix at the ground potential is formed outside the pixel portion.

Then, an acrylic film as a second interlayer insulating film 212 is formed at a thickness of 0.6–2.0 μm. In this embodiment, it is formed at a thickness of 1.2 μm. Specifically, an acrylic film as a second interlayer insulating film 212 having a flat surface is formed by spin coating using a spinner. The acrylic film is fired at 250° C. for 1 hour.

A contact hole for electrical connection to the drain region 204 is formed through the second interlayer insulating film 212 by dry etching with a fluorine-type etchant. At the same time, a contact hole for electrical connection between a black matrix and the lead-out electrode is formed.

Then, a Ta film as a black matrix is formed at a thickness of 100–300 nm. In this embodiment, it is formed at 150 nm. Thereafter, a resist is formed on the black matrix and then patterned into a pattern 230.

Then, anisotropic dry etching is performed on the black matrix with a fluorine-type etchant by using the pattern 230 as a mask. Although not shown in FIG. 5B, in this step, the second interlayer insulating film 212 is slightly etched with the fluorine-type etchant and its thickness is reduced.

As a result, a black matrix pattern 224 and a second drain electrode 225 are formed as shown in Fig. 5B. At the same time, the black matrix 224 is electrically connected to the lead-out electrode.

Then, after the resist pattern 230 is removed, anodization is performed in an electrolyte that is an aqueous solution of ammonium phosphate by using the black matrix 224 as the anode, whereby an anodic oxide film 218 made of $Ta_2O_5$ is formed at a thickness of 70–300 nm. In this embodiment, it is formed at a thickness of 150 nm. Other examples of the electrolyte are aqueous solutions of organic acids such as malonic acid, ammonium tartrate, ammonium phosphate, and ammonium borate.

In this embodiment, since the anodization is performed after the patterning, the black matrix 224 and the second drain electrode 225 are not electrically connected to each other. Therefore, while the anodization causes the anodic oxide film to be formed on the external surface of the black matrix 224, no anodic oxide film is formed on the second drain electrode 225 (see FIG. 5C). This facilitates formation of a contact hole for connecting a pixel electrode 229 to the second drain electrode 225.

Although in this embodiment the anodization is performed after the black matrix is patterned, anodization may be performed before the patterning to form an anodic oxide film over the entire surface. In particular, where an inorganic layer having a laminated structure of an anodic oxide film and an inorganic layer is to be formed, it is necessary to form an inorganic layer such as a silicon oxide film after forming an anodic oxide film over the entire surface by performing anodization before the patterning.

The state of FIG. 5C is thus obtained. Thereafter, an acrylic film is again formed as a third interlayer insulating film 213. The acrylic film is formed at a thickness of 0.2–0.7 μm (in this embodiment, 0.3 μm) by using a spinner, and then fired at 250° C.

Then, to form a contact hole for connection to the second drain electrode 225, dry etching is performed on the acrylic film with a fluorine-type etchant. Attention should be given to the fact that Ta of the second drain electrode 225 is etched with a fluorine-type etchant. A proper etchant needs to be selected so as to provide a sufficiently large selective etching ratio. In this embodiment, $CF_4$, $O_2$, and He are supplied at 5 sccm, 95 sccm, and 40 sccm.

Thereafter, an ITO conductive film to constitute a pixel electrode is formed and then subjected to patterning. As a result, as shown in FIG. 2B, a pixel electrode 229 is formed that is electrically connected to the drain region 204 via the first drain electrode 222 and the second drain electrode 225.

Region Y shown in FIG. 2B corresponds to a storage capacitor that is formed by the pixel electrode 229 and the black matrix 224. In this embodiment, because of the use of acrylic, the second interlayer insulating film 212 and the third interlayer insulating film 213 are higher in the level of flatness than those made of polyimide.

In this embodiment, because the anodic oxide film is used as the inorganic layer 218, an inorganic layer having a large permittivity value can be formed without causing peeling or the like due to residual stress. Further, since the anodization is performed after the patterning, the anodic oxide film can be formed on the entire external surface of the black matrix 224, which makes it possible to further reduce the frequency of occurrence of display failures due to particles or the like.

Forming the second drain electrode 225 as in this embodiment is effective because it is not necessary to consider a difference between the etching rates of the second interlayer insulating film 212 and the third interlayer insulating film 213.

Although in this embodiment the transmission-type liquid crystal display device is manufactured by using the ITO pixel electrode 229, it is also possible to manufacture a reflection-type liquid crystal display device by using a reflective electrode made of Al, Ti, or the like as the pixel electrode 229. The reflective electrode made of Al, Ti, or the like may be formed by sputtering.

Embodiment 3

Figure 3A:
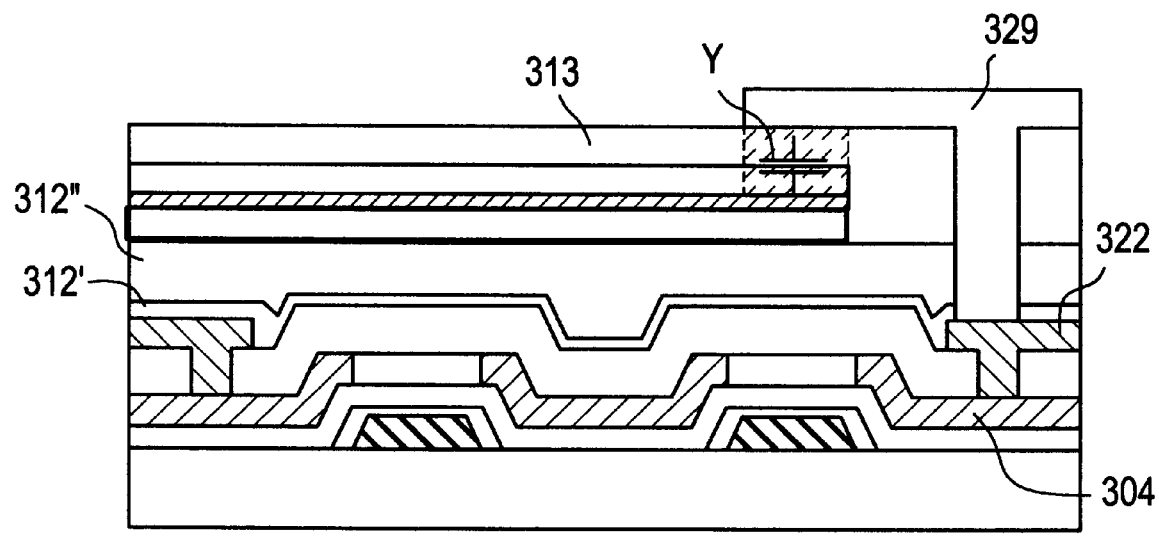
FIG. 3A is a schematic sectional view of a TFT substrate according to the invention.
Figure 3B:
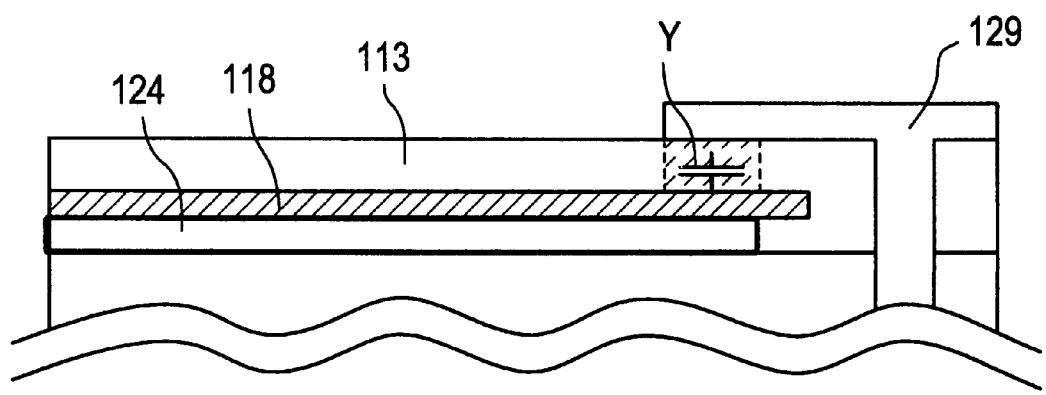
FIG. 3B is a schematic sectional view showing an inorganic layer having a visor-like shape.
Figure 6A:
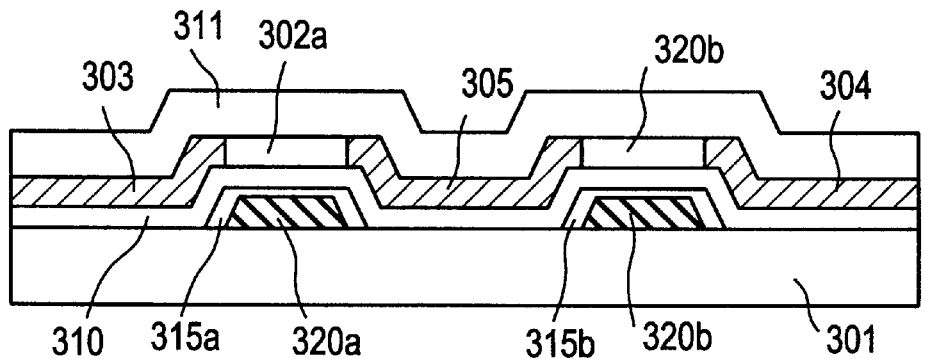
FIGS. 6A–6C show a manufacturing process of the TFT substrate of FIG. 3A.
Figure 6B:
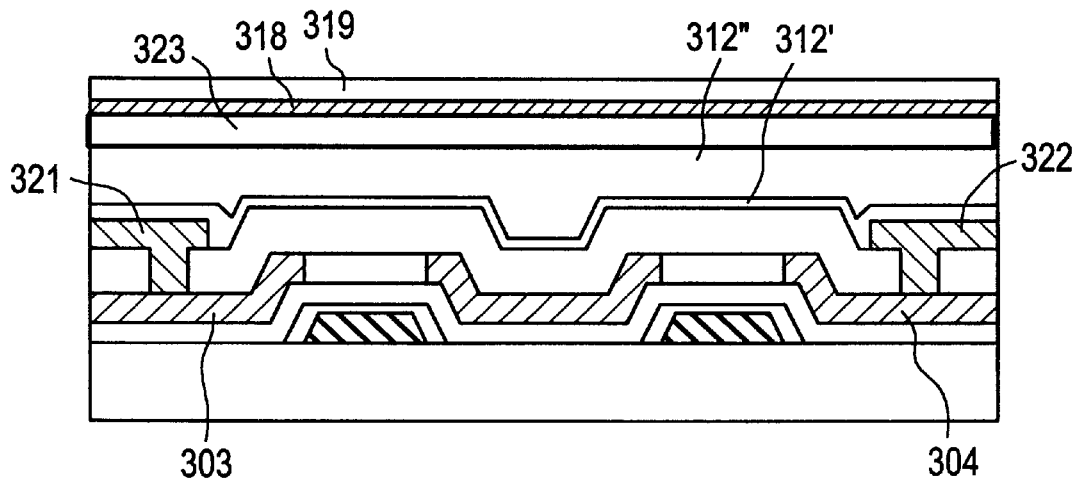
Figure 6C:
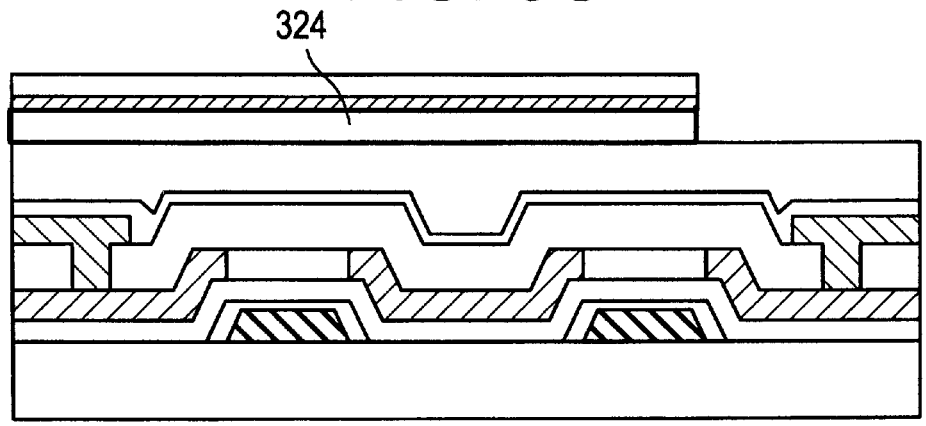

As shown in FIG. 3A, this embodiment is directed to a case of using an inverted staggered structure TFT. Further, this embodiment employs an inorganic layer having a laminated structure. FIGS. 6A–6C show a manufacturing process of this embodiment.

First, as shown in FIG. 6A, gate electrodes 320*a* and 320*b* are formed on a substrate 301. In this embodiment, a glass substrate on which a 100-nm-thick undercoat silicon oxide film is formed is used as the substrate 301, and a gate line is formed by forming a Ta film by sputtering and then subjecting it to patterning.

Subsequently, anodic oxide films 315*a* and 315*b* are formed by anodization in which the gate line is used as the anode and an aqueous solution of ammonium phosphate is used as the electrolyte. The anodic oxide films 315*a* and 315*b* made of $Ta_2O_5$ are formed at a thickness of 50–300 nm. In this embodiment, they are formed at a thickness of 100 nm. The anodic oxide films 315*a* and 315*b* will serve as part of a gate insulating film.

Then, a 150-nm-thick silicon nitride film is formed as a gate insulating film 310. Thereafter, a 50-nm-thick amorphous silicon film as a semiconductor layer is formed by plasma CVD.

Then, the amorphous silicon film is crystallized by illuminating it with excimer laser light. In this embodiment, the amorphous silicon film is crystallized at room temperature by scanning it with linear laser light of 30 Hz that is emitted from a XeCl excimer laser (wavelength: 308 nm). The energy density may be set to 200–400 $mJ/cm^2$. In this embodiment, it is set to 300 $mJ/cm^2$.

Then, a crystallized silicon film is patterned into an island-like crystalline silicon film.

Thereafter, a resist is formed on the island-like crystalline silicon film, and then exposed from the glass substrate 301 side, whereby a resist pattern is formed as a pattern obtained with the gate line serving as a mask. Then, an impurity is added by using the resist pattern as a mask.

In this embodiment, phosphorus as the impurity is added at a dose of $5 \times 10^{14}$ $cm^{-2}$. Then, a source region 303 and a drain region 304 are activated by applying excimer laser light again. In this embodiment, a KrF laser (wavelength: 248 nm) is used and the energy density is set to 250 $mJ/cm^2$.

As a result, an n-type TFT is obtained which has the source region 303, the drain region 304, an impurity-added region 305, and channel regions 302*a* and 302*b* that are formed on the respective gate electrodes 320*a* and 320*b*.

Then, a silicon oxide film as a first interlayer insulating film 311 is formed at a thickness of 400–1,200 nm by plasma CVD. In this embodiment, it is formed at a thickness of 600 nm. The state of FIG. 6A is thus obtained.

Then, contact holes are formed through the first interlayer insulating film 311 and a source line is formed in the same manner as in the first embodiment. In this manner, a source electrode 321 and a drain electrode 322 are formed. At the same time, a lead-out electrode for a black matrix is formed.

Subsequently, a laminated film of a silicon oxide film 312' and a polyimide film 312" is formed as a second interlayer insulating film 312. The silicon oxide film 312' is formed at a thickness of 200 nm by plasma CVD using TEOS and $O_2$. The polyimide film 312" is formed at a thickness of 0.8 $\mu$m by spin coating using a spinner.

A black matrix 323 is formed on the thus formed second interlayer insulating film 312 having a flat surface. In this embodiment, a 200-nm-thick black matrix 323 made of Cr is formed by sputtering.

Then, as shown in FIG. 6B, two layers of inorganic layers are formed on the black matrix 323. In this embodiment, a DLC film and a silicon oxide film are formed as a first inorganic layer 318 and a second inorganic layer 319, respectively.

The DLC film 318 is formed at a thickness of 50 nm by ion beam deposition using a hydrocarbon as an ion source. Subsequently, the silicon oxide film 319 is formed at a thickness of 100 nm by plasma CVD using $SiH_4$ and $O_2$.

Thereafter, a resist is applied and then patterned into a resist pattern. Subsequently, the silicon oxide film 319 is etched by dry etching using a fluorine-type etchant by using the resist pattern as a mask. Then, by using an oxygen-type etchant, etching of the DLC film 318 and ashing of the pattern are performed at the same time.

Then, patterning on the black matrix 323 is performed by dry etching using a chlorine-type etchant by using the organic layers as a mask. As a result, a patterned black matrix 324 is obtained as shown in FIG. 6C.

As described above, there is at least one patterning steps (in this embodiment, three patterning steps for the two inorganic layers 318 and 319 and the black matrix 323) after the formation of the inorganic layers 318 and 319 and before formation of a third interlayer insulating film 313.

Subsequently, a 0.3-$\mu$m-thick acrylic film as a third interlayer insulating film 313 is formed by spin coating using a spinner.

Then, a contact hole for connection to the drain electrode 322 is formed through the second interlayer insulating film 312' and 312" and the third interlayer insulating film 313 by dry etching using a fluorine-type etchant. Finally, an ITO film is formed as a pixel electrode 329, to obtain the state of FIG. 3A.

The resulting TFT substrate of a liquid crystal display device has a storage capacitor indicated by region Y. Since the inorganic layer has the laminated structure of the DLC film 318 and the silicon oxide film 319, the storage capacitor can increase the capacitance per unit area and can reduce leak current.

Since the pattern can be ashed in etching the DLC film 318, an increase in the number of steps that is caused by the employment of the multilayered structure can be minimized.

Although in this embodiment the transmission-type liquid crystal display device is manufactured by using the ITO pixel electrode 329, it is also possible to manufacture a reflection-type liquid crystal display device by using a reflective electrode made of Al, Ti, or the like as the pixel electrode 329. The reflective electrode made of Al, Ti, or the like may be formed by sputtering.

In this embodiment, the black matrix 324 and the inorganic layers 318 and 319 have the same shape because the former is patterned in a self-aligned manner. Alternatively, at least one of the inorganic layers 318 and 319 may be given a visor-like shape by performing excessive etching in the step of patterning the black matrix 324. This structure is preferable because even the end portion of the black matrix 324 can be prevented from being short-circuited due to particles existing in the organic resin.

Although in this embodiment only the drain electrode 322 is provided that is formed at the same time as the source line, a second drain electrode may also be provided in the step of forming the black matrix 324 in the same manner as described in the second embodiment.

Forming a second drain electrode is effective when, as in this embodiment, the second interlayer insulating film 312' and 312" has a laminated structure or the second and third interlayer insulating films are made of different materials, because it is not necessary to consider a difference between the etching rates.

Embodiment 4

This embodiment is directed to application examples of liquid crystal display devices in which the invention is applied to the pixel portion. FIGS. 7A–7F schematically show those application examples.

Figure 7A:
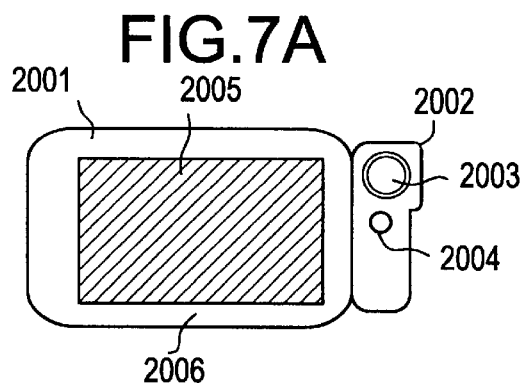
FIGS. 7A–7F show application examples of display devices to which the invention is applied.

FIG. 7A shows an example in which a liquid crystal display device according to the invention is used in an information display section of a PDA. A main body 2001 has a display device 2005, an integrated circuit 2006, and a camera section 2002. In the display device 2005, an inorganic layer is interposed between a black matrix and a pixel electrode. Specifically, the TFT substrate according to one of the first to third embodiments is used.

The camera section 2002 for input of an image is manipulated with a manipulation switch 2004. An image receiving section 2003 is constituted of a CCD or a CMOS solid-state imaging element.

Figure 7B:
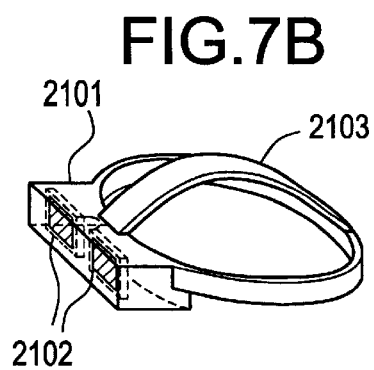

FIG. 7B shows an example in which a liquid crystal display device according to the invention is used in a display section of a HMD (head-mounted display). A main body 2101 is composed of display devices 2102 and a band section 2103. The invention is applied to the display devices 2102. Specifically, the TFT substrate according to one of the first to third embodiments is used.

Figure 7C:
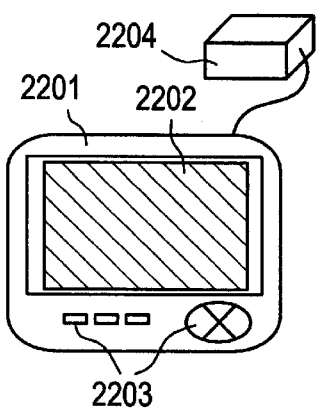

FIG. 7C shows an example in which a liquid crystal display device according to the invention is used in a display section of a car navigation system. A main body 2201 is composed of a display device 2202, manipulation switches 2203, and an antenna 2204. The invention is applied to the display device 2202. Specifically, the TFT substrate according to one of the first to third embodiments is used.

Figure 7D:
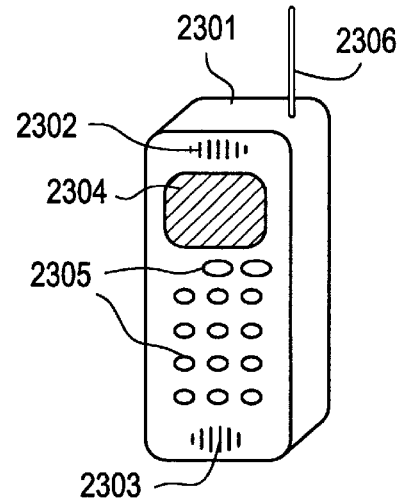

FIG. 7D shows an example in which a liquid crystal display device according to the invention is used in an information display section of a PHS. A main body 2301 is composed of a voice output section 2302, a voice input section 2303, a display device 2304, manipulation switches 2305, and an antenna 2306. The invention is applied to the display device 2304. Specifically, the TFT substrate according to one of the first to third embodiments is used.

Figure 7E:
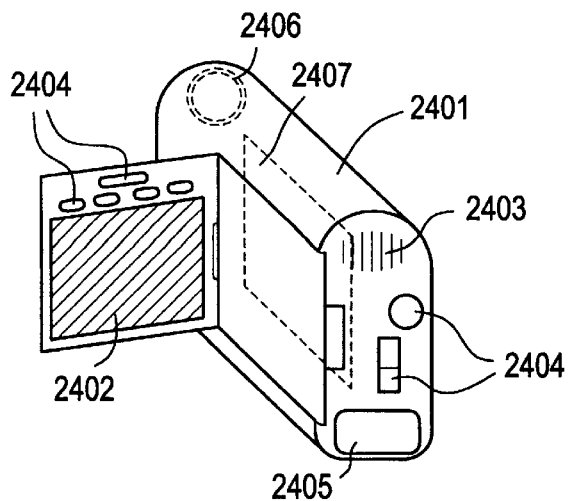

FIG. 7E shows an example in which a liquid crystal display device according to the invention is used in an display section of a video camera. A main body 2401 is composed of a display device 2402, a sound input section 2403, manipulation switches 2404, a battery 2405, an image receiving section 2406, and an integrated circuit 2407. The invention is applied to the display device 2402. Specifically, the TFT substrate according to one of the first to third embodiments is used.

Figure 7F:
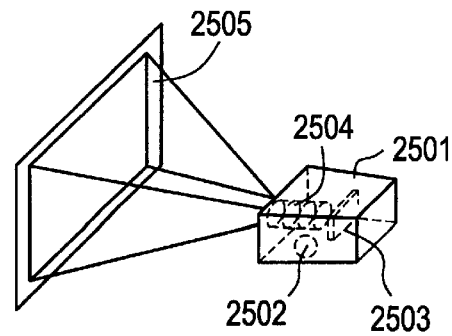
Figure 8A:
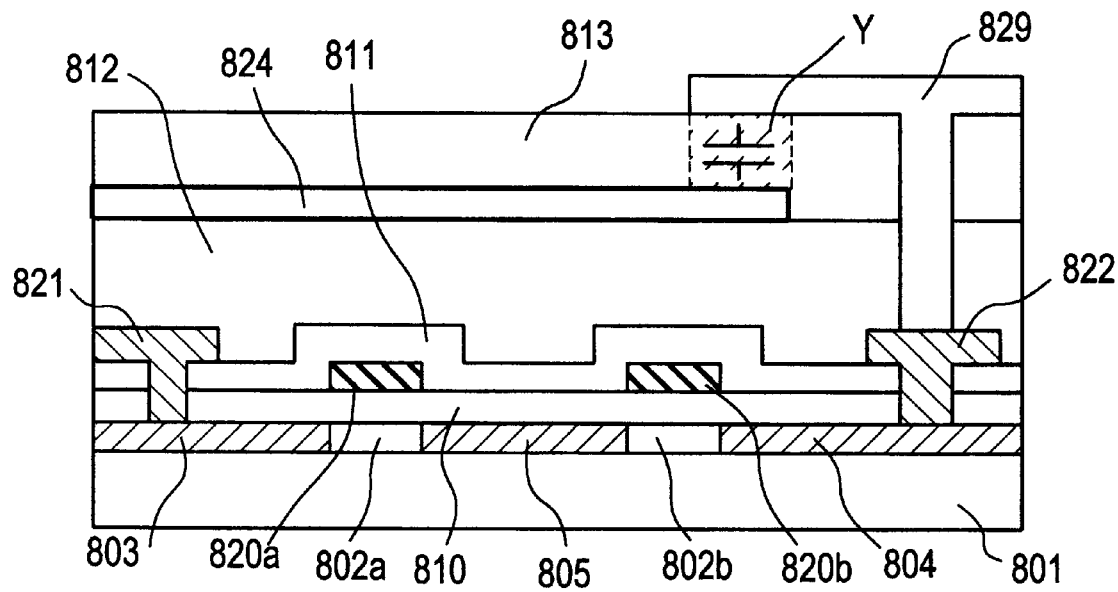
FIGS. 8A and 8B are sectional views each showing a pixel portion of a conventional liquid crystal display device using top capacitor type storage capacitors.
Figure 8B:
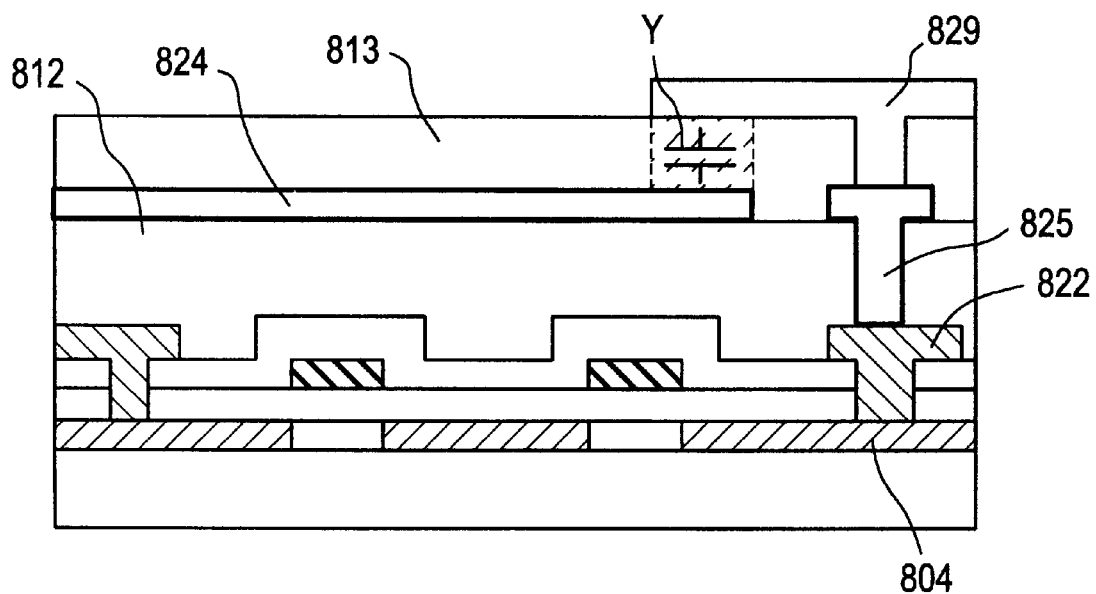
Figure 9:
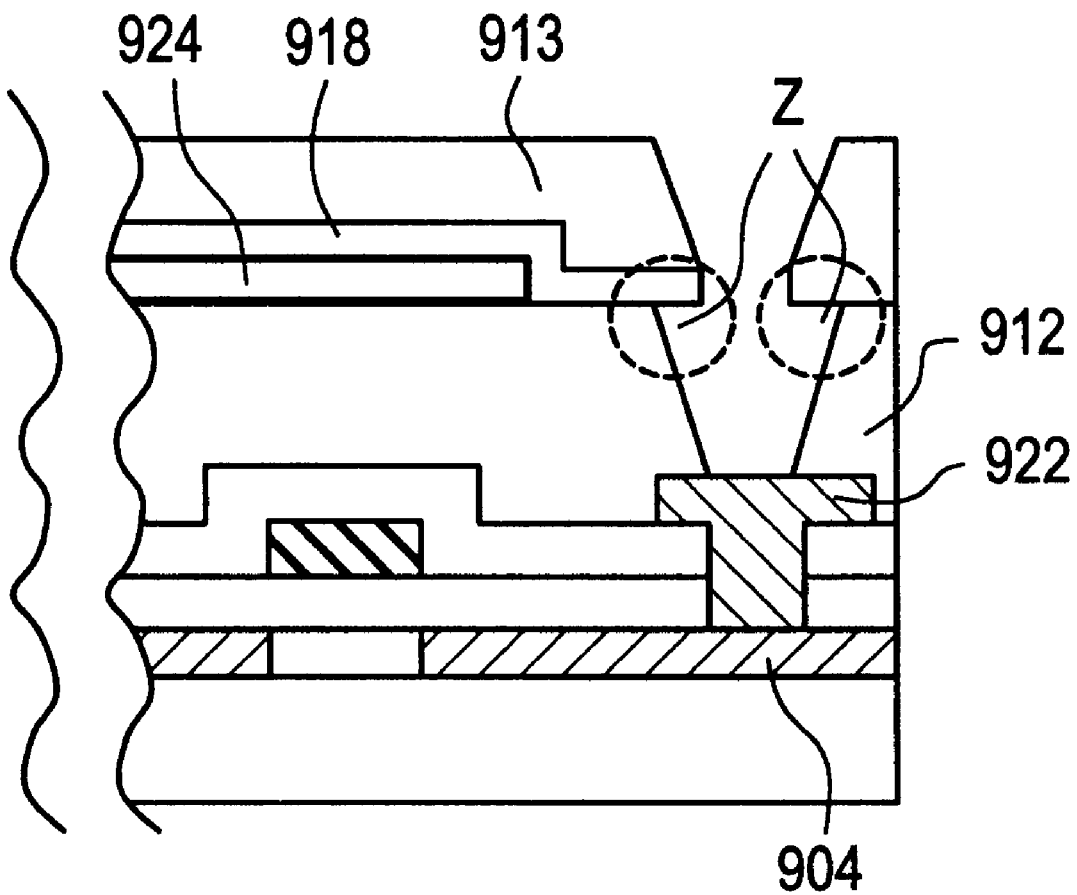
FIG. 9 shows a shape of a contact hole that is formed when a silicon nitride film is used.

FIG. 7F shows an example in which a liquid crystal display device according to the invention is used in an display section of a projector. A main body 2501 is composed of a light source 2502, a display device 2503, an optical system 2504, and a screen 2505. The invention is applied to the display device 2503. Specifically, the TFT substrate according to one of the first to third embodiments is used.

As described above, by providing an inorganic layer between a black matrix and a pixel electrode, the invention can provide a storage capacitor having a larger capacitance per unit area than conventional ones. A liquid crystal display device manufactured according to the invention has 20–30% higher contrast ratio than a conventional liquid crystal display device having no such inorganic layer.

Because of an increased capacitance per unit area, the area of the storage capacitor can be reduced and hence the aperture ratio can be increased. With the same panel size, the invention realizes higher resolution than conventional cases.

By using the inorganic layer, the frequency of occurrence of display failures due to particles in an organic resin film as a third interlayer insulating film can be reduced by a factor of 10 from that in conventional cases. In the case of a SXGA panel having about one million three hundred thousand pixels, the number of display failures due to particles smaller than 0.5 $\mu$m can be made several pieces or less. Further, forming the inorganic layer reduces the influences of particles, to thereby make it possible to reduce the thickness of the third interlayer insulating film. This enables further increase in the capacitance of the storage capacitor.

Short-circuiting due to particles can be prevented even by providing an inorganic layer for a conductive layer other than the black matrix which conductive layer is interposed between organic resin films.

By forming one of the black matrix and the inorganic layer in a self-aligned manner with respect to the other, stress that is exerted on the inorganic layer can be reduced and hence the frequency of occurrence of peeling can be reduced.

What is claimed is:

1. A liquid crystal display device comprising:
    top and bottom organic resin layers, the bottom organic resin layer having a planarized surface;
    a conductive layer interposed between the top and bottom organic resin layer; and
    an inorganic layer provided above the conductive layer and having approximately the same shape as the conductive layer.

2. The liquid crystal display device according to claim 1, wherein the inorganic layer comprises a material selected from the group consisting of silicon oxide, silicon nitride, and silicon oxynitride.

3. The liquid crystal display device according to claim 1, wherein one of the plurality of insulating films that is closest to the pixel electrode is a planarized organic resin layer.

4. The liquid crystal display device according to claim 1, wherein the organic resin layer or layers are made of one of polyimide and acrylic.

5. A PDA using the liquid crystal display device of claim 1.

6. A head-mounted display using the liquid crystal display device of claim 1.

7. A car navigation system using the liquid crystal display device of claim 1.

8. A PHS using the liquid crystal display device of claim 1.

9. A camera using the liquid crystal display device of claim 1.

10. A projection system using the liquid crystal display device of claim 1.

11. A liquid crystal display device having a storage capacitor comprising:
    a black matrix and a pixel electrode that are formed on an organic resin layer having a flat surface; and
    a plurality of insulating films provided between the black matrix and the pixel electrode, one of the insulating films that is adjacent to the black matrix is an inorganic layer.

12. The liquid crystal display device according to claim 11, wherein the inorganic layer comprises a material selected from the group consisting of silicon oxide, silicon nitride, and silicon oxynitride.

13. The liquid crystal display device according to claim 11, wherein one of the plurality of insulating films that is closest to the pixel electrode is a planarized organic resin layer.

14. The liquid crystal display device according to claim 11, wherein the organic resin layer or layers are made of one of polyimide and acrylic.

15. A liquid crystal display device having a storage capacitor comprising:

a black matrix and a pixel electrode that are formed on an interlayer insulating film that is an organic resin layer having a flat surface; and a plurality of insulating films provided between the black matrix and the pixel electrode, one of the insulating films that is adjacent to the black matrix is an inorganic layer that is patterned so as to have approximately the same shape as the black matrix.

16. The liquid crystal display device according to claim 15, wherein the inorganic layer is made of one of silicon oxide, silicon nitride, and silicon oxynitride.

17. The liquid crystal display device according to claim 15, wherein the organic resin layer or layers are made of one of polyimide and acrylic.

18. A method of manufacturing a liquid crystal display device, comprising:

forming a thin-film transistor on a substrate having an insulative surface;

forming an organic resin layer on the thin-film transistor;

forming a conductive layer on the organic resin layer;

forming at least one inorganic layer on the conductive layer;

executing at least one patterning step; and forming a planarized organic resin layer.

19. The manufacturing method according to claim 18 wherein the inorganic layer is made of one of silicon oxide, silicon nitride, and silicon oxynitride.

20. A method of manufacturing a liquid crystal display device, comprising:

forming a thin-film transistor on a substrate having an insulative surface;

forming a first interlayer insulating film so as to cover the thin-film transistor;

forming a second interlayer insulating film made of an organic material and having a flat surface on the first interlayer insulating film;

forming a black matrix on the second interlayer insulating film;

forming an inorganic layer on the black matrix;

patterning the black matrix and the inorganic layer into approximately the same shape;

forming a third interlayer insulating film made of an organic resin after the above step; and forming a pixel electrode so that it is electrically connected to a drain region of the thin-film transistor, wherein the pixel electrode and a patterned black matrix constitute a storage capacitor.

21. The manufacturing method according to claim 20, wherein the inorganic layer is made of one of silicon oxide, silicon nitride, and silicon oxynitride.

22. A method of manufacturing a liquid crystal display device, comprising:

forming a thin-film transistor on a substrate having an insulative surface;

forming a first interlayer insulating film so as to cover the thin-film transistor;

forming a second interlayer insulating film made of an organic material and having a flat surface on the first interlayer insulating film;

forming a black matrix on the second interlayer insulating film;

patterning the black matrix;

anodizing a patterned black matrix;

forming a third interlayer insulating film made of an organic resin after the above step; and forming a pixel electrode so that it is electrically connected to a drain region of the thin-film transistor, wherein the pixel electrode and the patterned black matrix constitute a storage capacitor.

23. An electronic device having an active matrix display device, said active matrix display device comprising:

a substrate having an insulating surface;

an active matrix circuit comprising a plurality of thin film transistors arranged in a matrix form over said substrate;

a first organic insulating film formed over said substrate and said plurality of thin film transistors;

a black matrix layer formed on said first organic insulating film;

a second organic insulating film formed over said first organic insulating film with said black matrix layer interposed therebetween;

a plurality of pixel electrodes formed over said second organic insulating film and electrically connected to said plurality of thin film transistors, wherein an inorganic insulating film is formed between said black matrix layer and said second organic insulating film.

24. An electronic device according to claim 23 wherein said inorganic insulating film has a substantially same pattern as said black matrix layer.

25. An electronic device according to claim 23 wherein each of said plurality of thin film transistors is a bottom gate type.

26. An electronic device according to claim 23 wherein each of said plurality of pixel electrodes partly overlap said black matrix layer to form a storage capacitor therebetween.

27. An electronic device according to claim 23 wherein said electronic device is a projection system.

28. An electronic device according to claim 23 wherein said electronic device is a video camera.

29. An electronic device according to claim 23 wherein said electronic device is a head-mounted display system.

* * * * *